United States Patent
Xu (10) Patent No.: US 11,361,593 B2
(45) Date of Patent: Jun. 14, 2022

(54) METHODS AND DEVICES FOR FACE ANTI-SPOOFING

(71) Applicant: Alipay Labs (Singapore) Pte. Ltd., Singapore (SG)

(72) Inventor: Yan Xu, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/353,481

(22) Filed: Jun. 21, 2021

(65) Prior Publication Data

US 2022/0067413 A1 Mar. 3, 2022

(30) Foreign Application Priority Data

Aug. 31, 2020 (SG) .......................... 10202008406Y (51) Int. Cl.
*G06V 40/40* (2022.01)
*G06K 9/62* (2022.01)
*G06V 40/60* (2022.01)
*G06V 40/16* (2022.01)

(52) U.S. Cl.
CPC .......... *G06V 40/45* (2022.01); *G06K 9/6257* (2013.01); *G06K 9/6265* (2013.01); *G06V 40/176* (2022.01); *G06V 40/67* (2022.01)

(58) Field of Classification Search
None
See application file for complete search history.

(56) References Cited

U.S. PATENT DOCUMENTS

| | | | |
|---|---|---|---|
| 2018/0032828 A1* | 2/2018 | Wang | G06K 9/00288 |
| 2018/0039990 A1 | 2/2018 | Lindemann | |
| 2018/0211102 A1* | 7/2018 | Alsmadi | G06K 9/00228 |
| 2019/0180469 A1* | 6/2019 | Gu | G06N 3/08 |
| 2020/0004939 A1* | 1/2020 | Streit | H04L 63/102 |

FOREIGN PATENT DOCUMENTS

WO WO 2016040506 3/2016

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Saad, "Anti-spoofing using challenge-response user interaction," Master's Thesis, American University in Cairo, Jan. 2015, pp. 1-72.

* cited by examiner

*Primary Examiner* — David Perlman
(74) *Attorney, Agent, or Firm* — Fish & Richardson P.C.

(57) ABSTRACT

Disclosed are computer-implemented methods, non-transitory computer-readable media, and systems for face anti-spoofing. One computer-implemented method includes receiving, by a server and from a user device, a plurality of images of a user face, each of the plurality of images corresponding to a facial expression performed by a user in response to each interaction challenge of a plurality of interaction challenges. The plurality of images are concatenated into a concatenated image. A convolutional neural network (CNN) classifier is used to obtain a confidence score for the concatenated image. A liveness of the user face is determined based on a comparison of the confidence score and a threshold value.

17 Claims, 8 Drawing Sheets

METHODS AND DEVICES FOR FACE ANTI-SPOOFING

CROSS-REFERENCE TO RELATED APPLICATIONS

This application claims priority to Singapore Patent Application No. 10202008406Y, filed on Aug. 31, 2020, which is hereby incorporated by reference in its entirety.

TECHNICAL FIELD

The present specification relates broadly, but not exclusively, to methods and devices for face anti-spoofing.

BACKGROUND

Electronic-Know Your Customer (eKYC) is a digital due diligence process performed by an entity to verify identities of its users and to assess potential risks of illegal intentions. In an eKYC process, face recognition is sometimes used to verify the identity of a user based on face biometrics. In a face recognition process, face liveness detection is a critical anti-spoofing procedure to determine whether a selfie face image taken for face recognition is from a live person or from an attack (e.g. screenshot, paper print, or mask).

Existing face anti-spoofing adopts two main methods: one relies heavily on user's cooperation to take numerous face images to determine liveness of a face, the other relies heavily on server side's algorithm to analyze one still face image to determine liveness of a face. These two main methods have great drawbacks. For example, the first method may cause obvious bad experiences to users, because it requires the users to cooperate in numerous interactions (such as to shake head, open mouth, blink eye, etc.) in order to take required numerous face images. As for the second method, it cannot achieve a satisfying accuracy in face liveness detection, because it only uses one single image to determine the liveness of a face whilst images of other views (such as at yaw angle or pitch angle) of the face are discarded.

A need therefore exists to provide methods and devices that seek to overcome or at least minimize the above mentioned problems.

SUMMARY

According to an embodiment of the present specification, there is provided a face anti-spoofing method. The method comprises: receiving a plurality of images of a user's face from a user device, each of the plurality of images corresponding to a facial expression performed by the user in response to each of a plurality of interaction challenges randomly selected from an interaction challenge library; concatenating the plurality of images into a concatenated image; using a convolutional neural network (CNN) classifier to obtain a confidence score for the concatenated image; and determining liveness of the user's face based on a comparison of the confidence score and a threshold value.

According to another embodiment of the present specification, there is provided a face anti-spoofing method. The method comprises: receiving a request for a plurality of interaction challenges from a server, wherein the plurality of interaction challenges are randomly selected from an interaction challenge library; capturing a plurality of images of a user's face, each of the plurality of images corresponding to a facial expression performed by the user in response to each of the plurality of interaction challenges; and transmitting the captured plurality of images to the server to obtain a confidence score so as to determine liveness of the face based on a comparison of the confidence score and a threshold value.

According to another embodiment of the present specification, there is provided a face anti-spoofing server. The server comprises at least one processor; and a memory coupled to the at least one processor and storing programming instructions for execution by the at least one processor, the programming instructions instruct the server to: receive a plurality of images of a user's face from a user device, each of the plurality of images corresponding to a facial expression performed by the user in response to each of a plurality of interaction challenges randomly selected from an interaction challenge library; concatenate the plurality of images into a concatenated image; use a convolutional neural network (CNN) classifier to obtain a confidence score for the concatenated image; and determine liveness of the user's face based on a comparison of the confidence score and a threshold value.

According to yet another embodiment of the present specification, there is provided a device for face anti-spoofing. The device comprises at least one processor; and a memory coupled to the at least one processor and storing programming instructions for execution by the at least one processor, the programming instructions instruct the device to: receive a request for a plurality of interaction challenges from a server, wherein the plurality of interaction challenges are randomly selected from an interaction challenge library; capture a plurality of images of a user's face, each of the plurality of images corresponding to a facial expression performed by the user in response to each of the plurality of interaction challenges; and transmit the captured plurality of images to the server to obtain a confidence score so as to determine liveness of the face based on a comparison of the confidence score and a threshold value.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "concatenating", "using", "determining", "capturing", "transmitting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the specification.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Embodiments of the methods and devices in the present specification require fewer interactions from user's side, and in the meanwhile, are able to analyze multiple face images showing multiple views of a face at server's side to determine whether the multiple face images taken for face recognition are from a live person or from an attack. In this manner, the present embodiments of the methods and devices not only improve user experience but also achieve a higher accuracy in face liveness detection.

Figure 1:
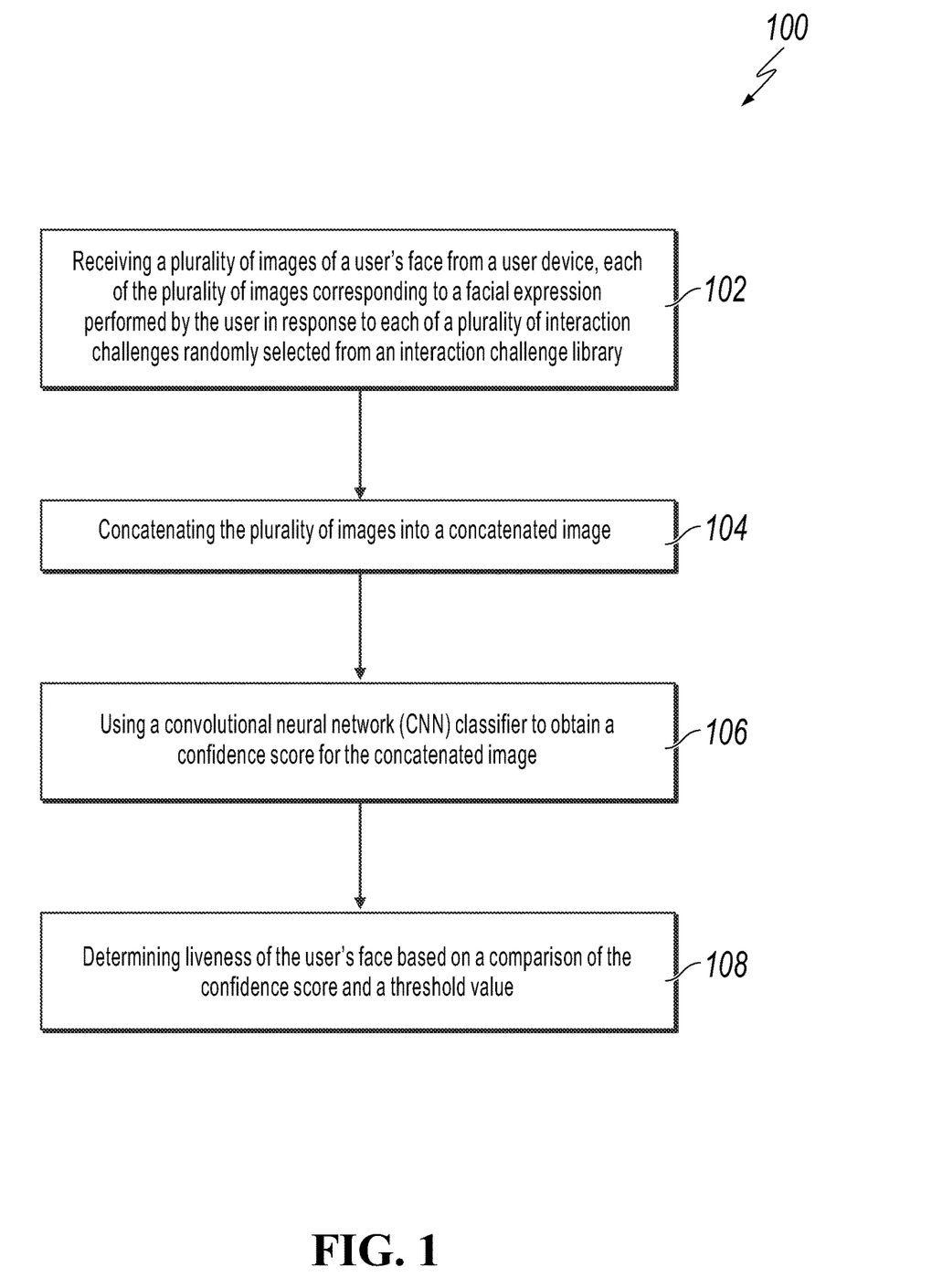
FIG. 1 is a flow chart illustrating an example of a face anti-spoofing method 100 according to an embodiment. In this embodiment, the method 100 is performed at a server for face anti-spoofing (hereinafter, a face anti-spoofing server).

FIG. 1 is a flow chart illustrating an embodiment of a face anti-spoofing method 100 performed at a server for face anti-spoofing. In the present specification, the server for face anti-spoofing is interchangeably referred to as a face anti-spoofing server. In the present embodiment, the face anti-spoofing method 100 includes steps 102, 104, 106 and 108.

At step 102, the face anti-spoofing server receives a plurality of images of a user's face from a user device. Each of the plurality of images corresponds to a facial expression performed by the user in response to each of a plurality of interaction challenges randomly selected from an interaction challenge library.

Figure 3A:
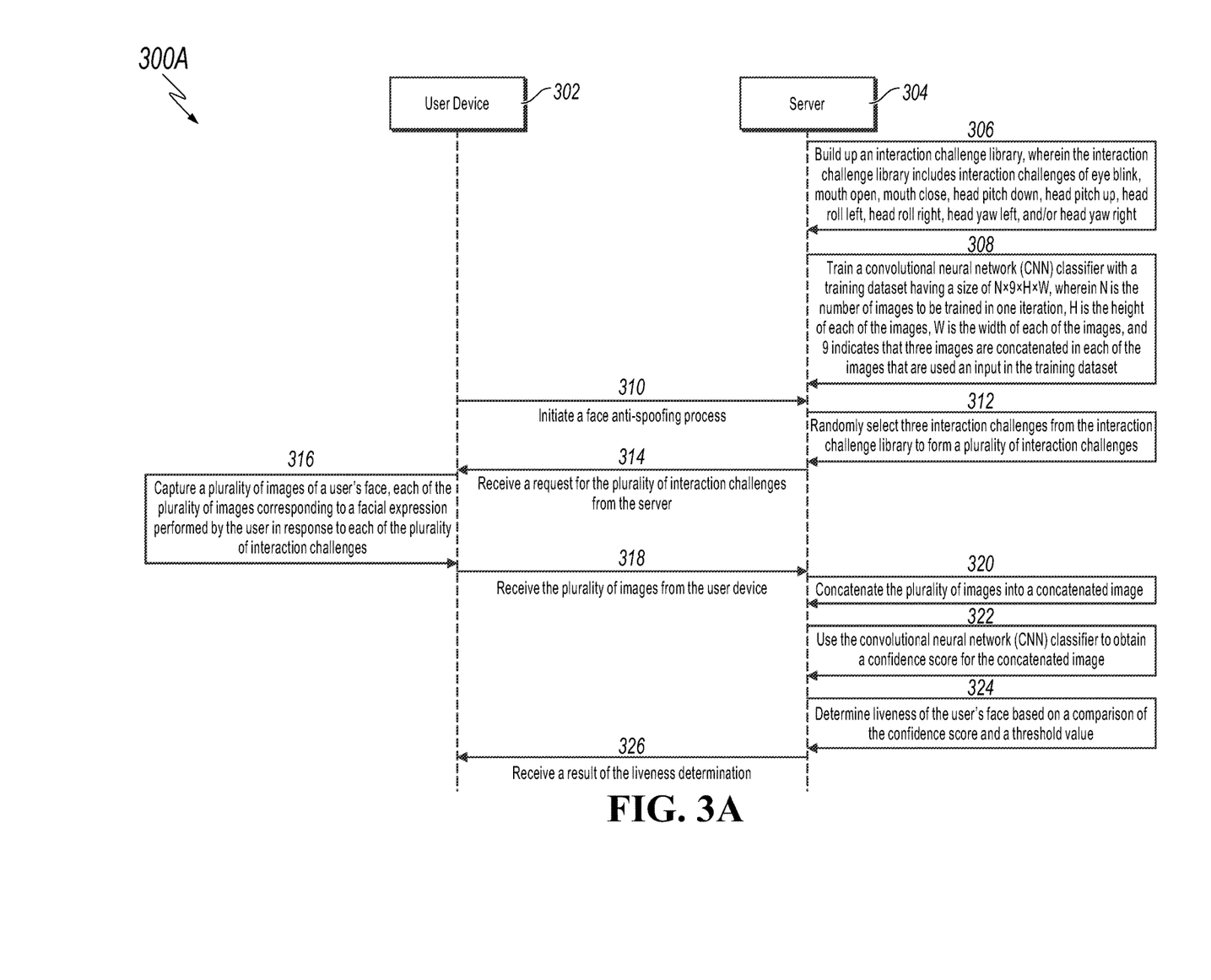
FIG. 3A shows a diagram 300A depicting an example of data flow between a user device 302 and a face anti-spoofing server 304 in an embodiment of face anti-spoofing method.
Figure 3B:
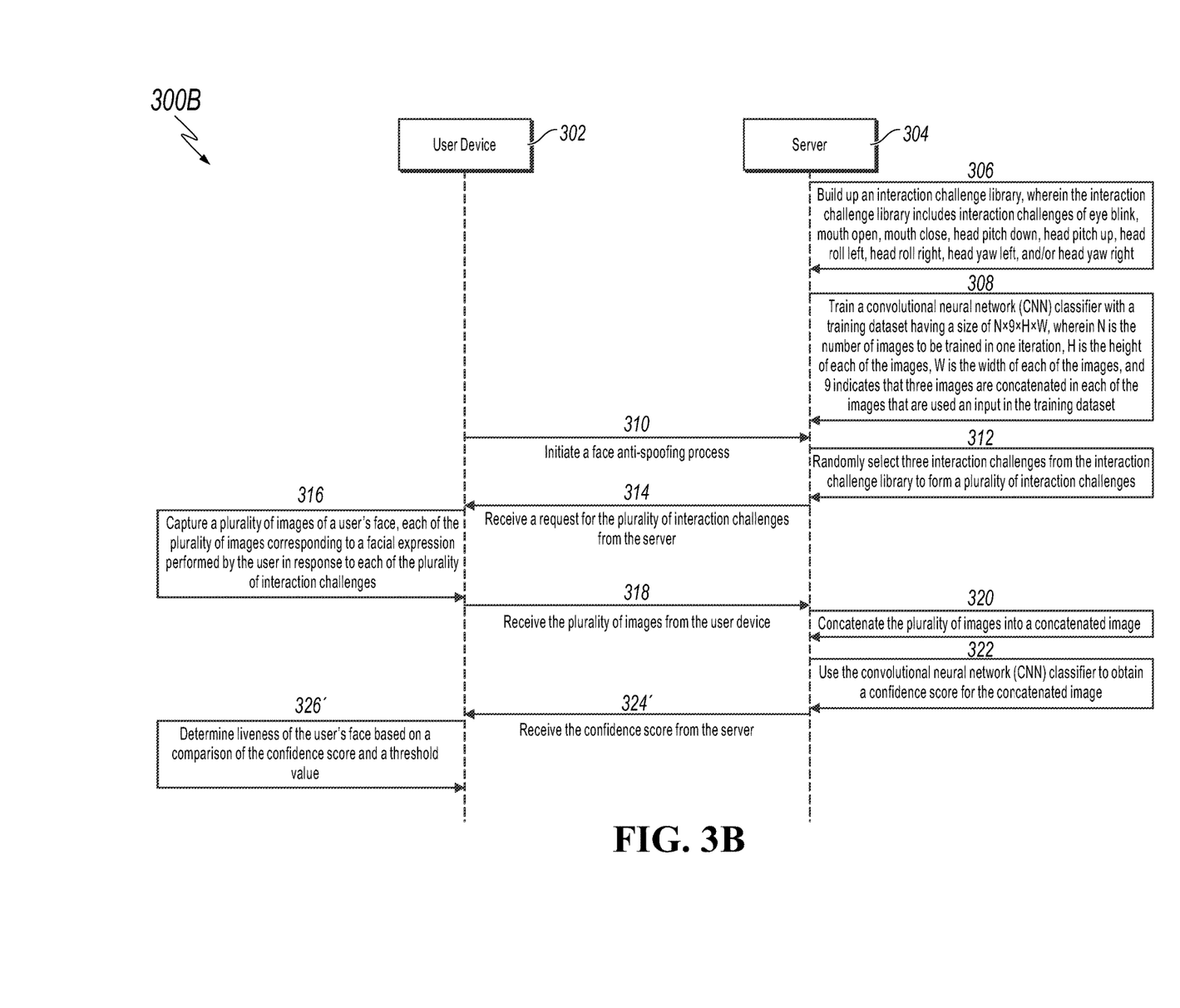
FIG. 3B shows a diagram 300B depicting an example of data flow between a user device 302 and a face anti-spoofing server 304 in another embodiment of face anti-spoofing method.

In some embodiment, step 102 can be initiated by the face anti-spoofing server in response to receipt of a request from the user device to initiate a face anti-spoofing process. Examples of such a process are depicted in FIGS. 3A and 3B and described in the corresponding paragraphs.

Figure 4:
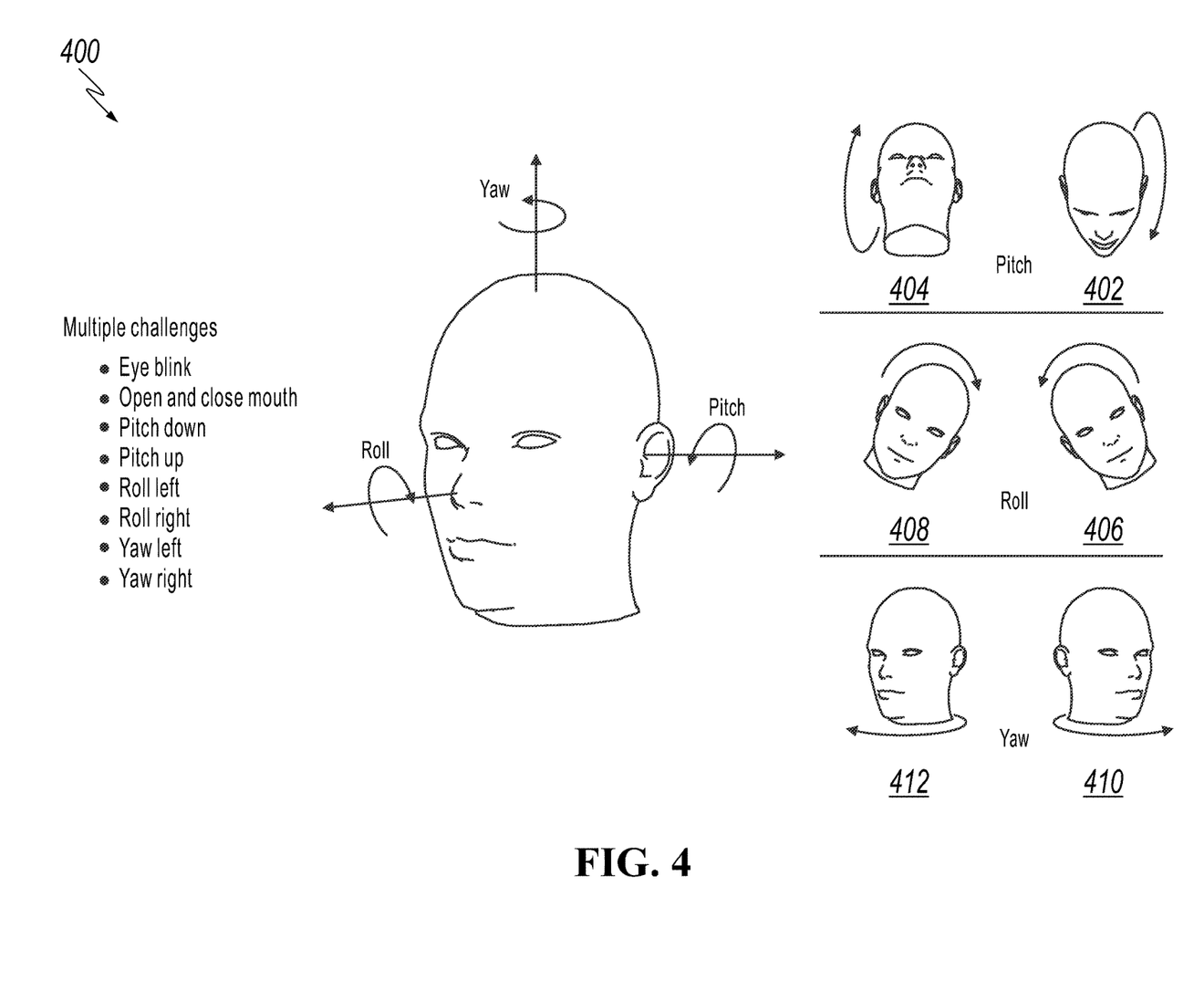
FIG. 4 shows a diagram 400 depicting an embodiment of an interaction challenge library. In the embodiment 400, the interaction challenge library includes interaction challenges of eye blink, mouth open, mouth close, head pitch down 402, head pitch up 404, head roll left 406, head roll right 408, head yaw left 410, and/or head yaw right 412.

Prior to step 102, the face anti-spoofing server can build up the interaction challenge library. An embodiment 400 of the interaction challenge library is shown in FIG. 4. As shown in FIG. 4, the interaction challenge library includes interaction challenges of eye blink, mouth open, mouth close, head pitch down 402, head pitch up 404, head roll left 406, head roll right 408, head yaw left 410, and/or head yaw right 412. It is appreciable to those skilled in the art that the interaction challenge library can include further interaction challenges.

For each interaction challenge, it requires at least a start expression and an end expression of the face, and the user must complete it within a certain time period; otherwise, the interaction challenge is terminated. For example, during a mouth open challenge, the user needs to open his/her mouth and then close his/her mouth within the certain time period. The certain time period can be predetermined based on practical accuracy and user experience requirements, e.g. 2 seconds, 3 seconds, or the like.

Prior to step 102, in some embodiments, the face anti-spoofing server can randomly select three interaction challenges from the interaction challenge library to form the plurality of interaction challenges. In some alternative embodiments, the number of the randomly selected interaction challenges is variable to satisfy practical requirements of accuracy and user experience. For example, the plurality of interaction challenges can include two, four, or other number of randomly selected interaction challenges in these alternative embodiments.

In some embodiments, the randomly selected interaction challenges can be indicated by the face anti-spoofing server in a request for the plurality of interaction challenges sent to a user device in response to receipt of a request from the user device to initiate a face anti-spoofing process. In response to the request for the plurality of interaction challenges from the face anti-spoofing server, the user device captures a plurality of images of the user's face in accordance with the plurality of interaction challenges.

As described above, each of the plurality of interaction challenges requires at least a start expression and an end expression of the face, and the user must finish it within a certain time period. For example, an eye blink challenge can require an eyes-open expression as a start expression and an eyes-closed expression as an end expression. A mouth open challenge can require a mouth-closed expression as a start expression and a mouth-open expression as an end expression. A mouth close challenge can require a mouth-open expression as a start expression and a mouth-closed expression as an end expression. A head pitch down challenge can require a start expression of head front facing and an end expression of head pitching down. A head pitch up challenge can require a start expression of head front facing and an end expression of head pitching up. A head roll left challenge can require a start expression of head front facing and an end expression of head rolling left. A head roll right challenge can require a start expression of head front facing and an end expression of head rolling right. A head yaw left challenge can require a start expression of head front facing and an end expression of head yawing left. A head yaw right challenge can require a start expression of head front facing and an end expression of head yawing right. It can be appreciated to those skilled in the art that the above plurality of interaction challenges can require other expressions as the start expressions and end expressions.

It is advantageous to require at least a start expression and an end expression for each of the plurality of interaction challenges. Such a requirement defines a start point and an end point for each interaction challenge. In this manner, whoever a user is, a start point of an interaction challenge is only triggered when the user makes the start expression of the interaction challenge and an end point of the interaction challenge is only triggered when the user makes the end expression of the interaction challenge. Such a mechanism facilitates to determine whether an interaction challenge is completed by a user, and facilitates to calculate the duration from the start point to the end point so as to determine whether the interaction challenge is completed within a certain time period (e.g. 2 seconds, 3 seconds, or the like). If a user fails to complete an interaction challenge within a certain time period, the user device may request the user to redo a same or different interaction challenge.

It can be appreciated to those skilled in the art that, in addition to or in replacement of the start expression and the end expression, one or more intermediate expressions can be required in each of the plurality of interaction challenges. In these scenarios, the one or more intermediate expressions define one or more intermediate points for each interaction challenge. For the sake of simplicity, details of the intermediate expressions and intermediate points are not described herein.

For each of the plurality of interaction challenges, once the user completes the task, an image of the end expression is captured as one of the plurality of images for face anti-spoofing. For example, if the plurality of interaction challenges includes a mouth open challenge, the user needs to open his/her mouth and then close his/her mouth within the certain time period, and an image will be captured by the end of the time period when the user closes his/her mouth. In this manner, each of the plurality of images corresponds to a facial expression performed by the user in response to each of a plurality of interaction challenges randomly selected from the interaction challenge library.

It provides twofold advantages to capture an image of the end expression for each of the plurality of interaction challenges as one of the plurality of images for face anti-spoofing. First, this mechanism ensures that images captured from different users of a same interaction challenge reflect a same facial expression, which in turn facilitates an accurate data training process of the captured images. Further, this mechanism standardizes a timing to capture an image of each interaction challenge at the end point of each interaction challenge, which in turn improves efficiency of the face anti-spoofing process.

It can be appreciated to those skilled in the art that, in addition to or alternative to an image of the end expression, an image of an intermediate expression and/or an image of the start expression can be captured for each of the plurality of interaction challenges. In this manner, the face anti-spoofing methods, devices and systems described herein can provide a further enhanced accuracy.

The plurality of images are then transmitted from the user device and received by the face anti-spoofing server at step 102. Examples of such a process are depicted in FIGS. 3A and 3B and described in the corresponding paragraphs.

At step 104, the face anti-spoofing server concatenates the plurality of images into a concatenated image. For example, if the plurality of images includes three images each of which having a size of 128×128×3, the three images can be concatenated into a concatenated image having a size of 128×128×9.

At step 106, the face anti-spoofing server uses a convolutional neural network (CNN) classifier to obtain a confidence score for the concatenated image.

The CNN classifier can be trained by the face anti-spoofing server prior to step 102. Prior to step 102, the face anti-spoofing server can train a CNN classifier with a training dataset. In some embodiments, the training dataset has a size of N×9×H×w, wherein N is a number of images to be trained in one iteration, H is a height of each of the images, W is a width of each of the images. In this embodiment, 9 indicates that three images are concatenated in each of the images that are used as input in the training dataset. Such a trained CNN classifier is suitable to determine liveness of a user's face based on three images of the user's face corresponding to three facial expressions performed by the user in response to the three randomly selected interaction challenges as described above.

In alternative embodiments, the CNN classifier may be trained by the face anti-spoofing server with a training dataset having a different size. For example, the training dataset can have a size of N×V×H×w, wherein N is the number of images to be trained in one iteration, H is the height of each of the images, W is the width of each of the images, and V indicates that ⅓ V images are concatenated in each of the images that are used as input in the training dataset. In this manner, a CNN classifier trained with a training dataset having a size of N×6×H×W will be suitable to determine liveness of a user's face based on 2 images of the user's face corresponding to 2 facial expressions performed by the user in response to 2 randomly selected interaction challenges. Likewise, a CNN classifier trained with a training dataset having a size of N×12×H×W will be suitable to determine liveness of a user's face based on 4 images of the user's face corresponding to 4 facial expressions performed by the user in response to 4 randomly selected interaction challenges.

Figure 6:
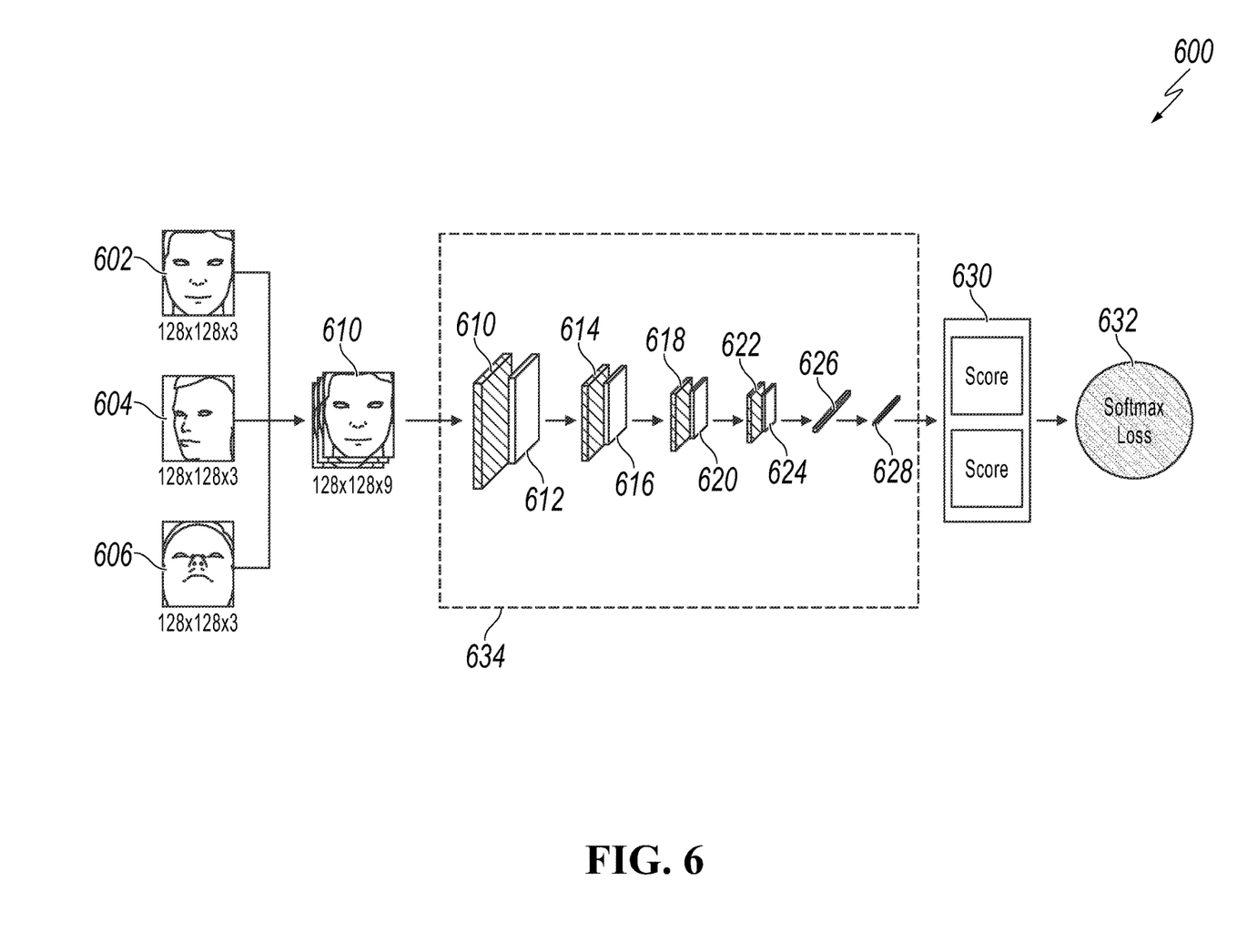
FIG. 6 shows a flow chart illustrating an example of a method 600 of training a convolutional neural network (CNN) classifier according to an embodiment. In this embodiment, the CNN classifier is trained with a training dataset having a size of N×9×H×w, wherein N is a number of images to be trained in one iteration, H is a height of each of the images, and W is a width of each of the images. In this embodiment, 9 indicates that three images are concatenated in each of the images that are used as input in the training dataset.

In an embodiment shown in FIG. 6, at step 106, a concatenated image 608 can be inputted by the face anti-spoofing server into a CNN classifier 734 to obtain a confidence score.

Thereafter, at step 108, the face anti-spoofing server determines liveness of the user's face based on a comparison of the confidence score and a threshold value T. For example, if the confidence score is greater than the threshold value T, the face anti-spoofing server can determine that the plurality of images received from the user device are from an attack, not a live person. The concatenated image 608 may be labelled as "attack" and used for future training of the CNN classifier 734. Likewise, if the confidence score is less than or equal to the threshold value T, the face anti-spoofing server can determine that the plurality of images received from the user device are indeed from a live person. The concatenated image 608 may be labelled as "real" and used for future training of the CNN classifier 734.

By virtue of the random selection of interaction challenges from a broad range of interaction challenges collected in the interaction challenge library, the present specification achieves a reliable face anti-spoofing mechanism without requesting numerous interactions from the user. In this manner, user experience can be improved without sacrificing accuracy of face liveness detection.

In the meanwhile, by virtue of the usage of the plurality of images each corresponding to a facial expression performed by the user in response to each of the plurality of interaction challenges randomly selected from the interaction challenge library, the present specification can achieve a higher accuracy in face liveness detection by concatenating the plurality of images and using a CNN classifier to determine liveness of the concatenated image.

Figure 2:
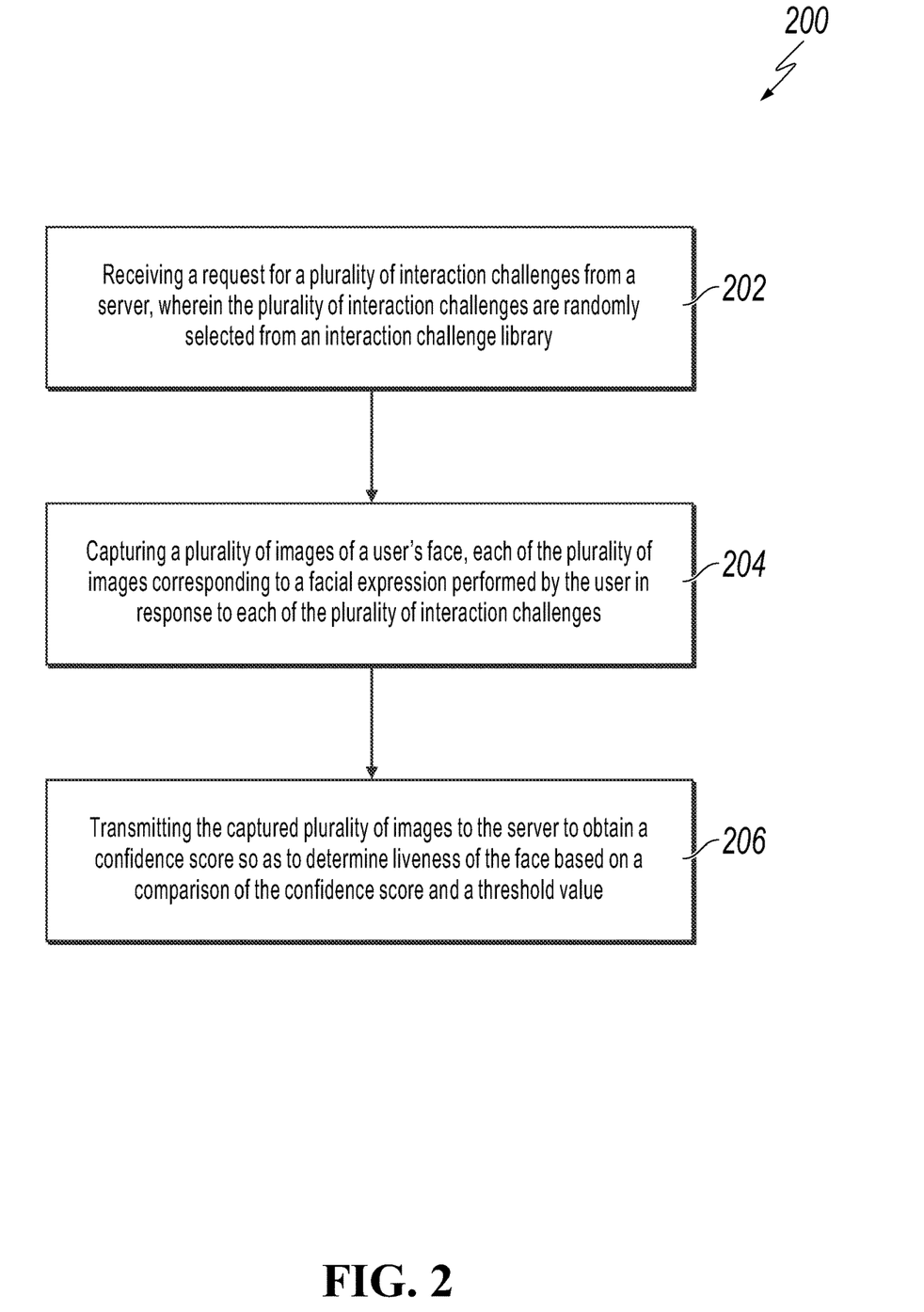
FIG. 2 is a flow chart illustrating an example of a face anti-spoofing method 200 according to another embodiment. In this embodiment, the method 200 is performed at a device for face anti-spoofing. The device can be a user device that a user uses in an eKYC process, e.g. the user's mobile phone, etc.

FIG. 2 is a flow chart illustrating a face anti-spoofing method 200 according to another embodiment. In this embodiment, the method 200 is performed at a device for face anti-spoofing. The device can be a user device that a user uses in an eKYC process, e.g. the user's mobile phone, etc. For the sake of simplicity, the device for face anti-spoofing is interchangeably referred to as the user device in the present description. In the present embodiment, the face anti-spoofing method 200 includes steps 202, 204 and 206.

At step 202, the user device receives a request for a plurality of interaction challenges from a server. In this embodiment, the server is the face anti-spoofing server as described with regards to FIG. 1. The plurality of interaction challenges are randomly selected by the face anti-spoofing server from an interaction challenge library.

In some embodiments, the interaction challenge library is built up and stored at the face anti-spoofing server. The interaction challenge library can include interaction challenges of eye blink, mouth open, mouth close, head pitch down, head pitch up, head roll left, head roll right, head yaw left, and/or head yaw right. It is appreciable to those skilled in the art that the interaction challenge library can include further interaction challenges. For each interaction challenge, it requires at least a start expression and an end expression of the face, and the user must complete it within a certain time period; otherwise, the interaction challenge is terminated. For example, during a mouth open challenge, the user needs to open his/her mouth and then close his/her mouth within the certain time period. The certain time period can be predetermined based on practical accuracy and user experience requirements, e.g. 2 seconds, 3 seconds, or the like.

In some embodiments, the plurality of interaction challenges include three interaction challenges randomly selected from the interaction challenge library. In some alternative embodiments, the number of the randomly selected interaction challenges is variable to satisfy practical requirements of accuracy and user experience. For example, the plurality of interaction challenges can include two, four, or other number of randomly selected interaction challenges in these alternative embodiments.

In some embodiments, the request for the plurality of interaction challenges received by the user device at step 202 can be generated by the face anti-spoofing server in response to receipt of a request from the user device to initiate a face anti-spoofing process. Examples of such a process are depicted in FIGS. 3A and 3B and described in the corresponding paragraphs.

At step 204, the user device captures a plurality of images of a user's face, each of the plurality of images corresponding to a facial expression performed by the user in response to each of the plurality of interaction challenges. As described above, each of the plurality of interaction challenges requires at least a start expression and an end expression of the face, and the user must finish it within a certain time period. For each of the plurality of interaction challenges, once the user completes the task, an image of the end expression is captured as one of the plurality of images for face anti-spoofing. For example, if the plurality of interaction challenges includes a mouth open challenge, the user needs to open his/her mouth and then close his/her mouth within the certain time period, and an image will be captured by the end of the time period when the user closes his/her mouth.

At step 206, the user device transmits the captured plurality of images to the face anti-spoofing server to obtain a confidence score so as to determine liveness of the face based on a comparison of the confidence score and a threshold value.

Upon transmission of the captured plurality of images from the user device to the face anti-spoofing server at step 206, the face anti-spoofing server concatenates the plurality of images into a concatenated image and uses a convolutional neural network (CNN) classifier to obtain a confidence score for the concatenated image as described with regards to step 104 and 106 of FIG. 1. Thereafter, in some embodiments, the face anti-spoofing server determines liveness of the user's face based on a comparison of the confidence score and a threshold value T as described with regards to step 108 of FIG. 1. In alternative embodiments, the face anti-spoofing server may transmit the confidence score to the user device, and the user device subsequently determines liveness of the user's face based on a comparison of the confidence score and a threshold value T. An example of the alternative embodiments is depicted in FIG. 3B.

As described above, by virtue of the random selection of interaction challenges from a broad range of interaction challenges collected in the interaction challenge library, the present specification achieves a reliable face anti-spoofing mechanism without requesting numerous interactions from the user. In this manner, user experience can be improved without sacrificing accuracy of face liveness detection.

In the meanwhile, by virtue of the usage of the plurality of images each corresponding to a facial expression performed by the user in response to each of the plurality of interaction challenges randomly selected from the interaction challenge library, the present specification can achieve a higher accuracy in face liveness detection by concatenating the plurality of images and using a CNN classifier to determine liveness of the concatenated image.

FIGS. 3A and 3B depict data flow between a user device 302 and a face anti-spoofing server 304 in embodiments 300A and 300B of face anti-spoofing method.

As shown, the embodiments 300A and 300B of face anti-spoofing method include same steps 306, 308, 310, 312, 314, 316, 318, 320 and 322. Subsequent to step 322, the embodiment 300A further includes steps 324 and 326, whereas the embodiment 300B includes steps 324' and 326'.

In FIG. 3A, steps 318, 320, 322 and 324 correspond to steps 102, 104, 106 and 108 of the face anti-spoofing method 100 as shown in FIG. 1. In FIGS. 3A and 3B, steps 314, 316 and 318 correspond to steps 202, 204 and 206 of the face anti-spoofing method 200 as shown in FIG. 2.

At step 306, the face anti-spoofing server 304 builds up an interaction challenge library, wherein the interaction challenge library includes interaction challenges of eye blink, mouth open, mouth close, head pitch down, head pitch up, head roll left, head roll right, head yaw left, and/or head yaw right.

At step 308, the face anti-spoofing server 304 trains a convolutional neural network (CNN) classifier with a training dataset having a size of N×9×H×W, wherein N is a number of images to be trained in one iteration, H is a height of each of the images, and W is a width of each of the images. In this embodiment, 9 indicates that three images are concatenated in each of the images that are used as input in the training dataset.

At step 310, the user device 302 initiates a face anti-spoofing process.

At step 312, in response to receipt of a request from the user device 302 to initiate a face anti-spoofing process, the face anti-spoofing server 304 randomly selects three interaction challenges from the interaction challenge library to form a plurality of interaction challenges. Alternatively, as described with respect to FIGS. 1 and 2, the face anti-spoofing server 304 can randomly select a different number of interaction challenges from the interaction challenge library to form the plurality of interaction challenges. In these alternative embodiments, the CNN classifier may have been trained with a different size of training dataset other than N×9×H×W.

At step 314, the user device 302 receives a request for the plurality of interaction challenges from the face anti-spoofing server 304.

At step 316, in response to the request received at step 314, the user device 302 captures a plurality of images of a user's face, each of the plurality of images corresponding to a facial expression performed by the user in response to each of the plurality of interaction challenges.

At step 318, the user device 302 transmits the plurality of images to the face anti-spoofing server 304. In other words, the face anti-spoofing server 304 receives the plurality of images from the user device 302.

At step 320, the face anti-spoofing server 304 concatenates the plurality of images into a concatenated image.

At step 322, the face anti-spoofing server 304 uses the convolutional neural network (CNN) classifier to obtain a confidence score for the concatenated image.

Once the confidence score is obtained at step 322, at step 324, the face anti-spoofing server 304 determines liveness of the user's face based on a comparison of the confidence score and a threshold value.

As an alternative embodiment of step 324, at step 324', the face anti-spoofing server 304 may transmit the confidence score to the user device 302. In other words, at step 324', the user device 302 receives the confidence score from the face anti-spoofing server 304.

Once the liveness of the user's face is determined at step 324, at step 326, the face anti-spoofing server 304 may transmit a result of the face liveness determination to the user device 302. In other words, at step 326, the user device 302 receives a result of the face liveness determination from the face anti-spoofing server 304.

As an alternative embodiment of step 326, at step 326', the user device 302 may determine liveness of the user's face based on a comparison of the confidence score received at step 324' and a threshold value.

Figure 5:
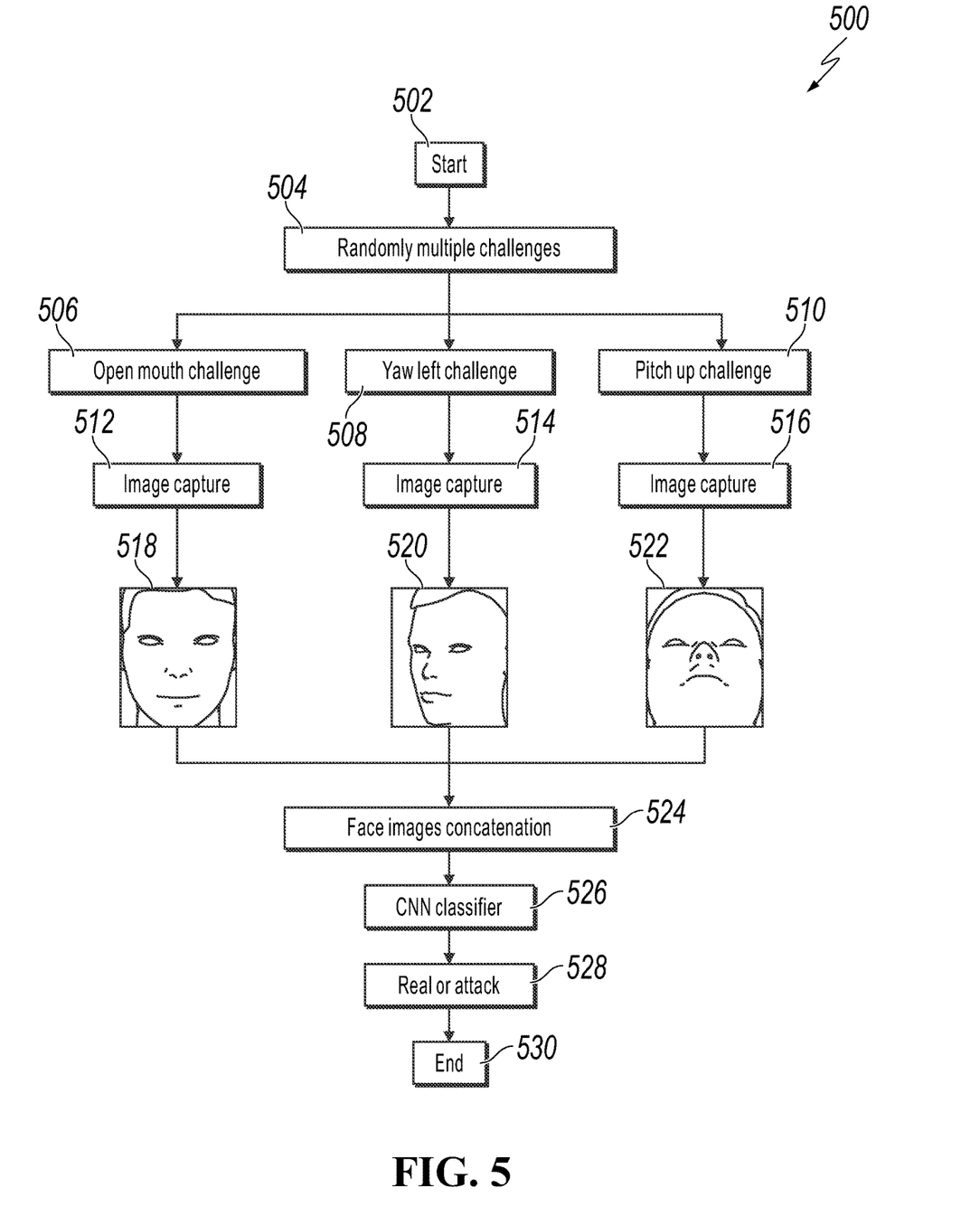
FIG. 5 shows a flow chart illustrating an example of a face anti-spoofing process 500 according to an embodiment. This embodiment includes steps performed at a face anti-spoofing server and a device for face anti-spoofing.

FIG. 5 shows a flow chart illustrating a face anti-spoofing process 500 according to an embodiment. This embodiment includes steps performed at a face anti-spoofing server and a user device.

As shown in FIG. 5, at step 502, the face anti-spoofing process 500 is initiated at the user device.

At step 504, in response to the initiation of the face anti-spoofing process, the face anti-spoofing server randomly selects three interaction challenges from an interaction challenge library to form a plurality of interaction challenges.

In the present embodiment, mouth open challenge, head yaw left challenge and head pitch up challenge are randomly selected and form the plurality of interaction challenges. The face anti-spoofing server then transmits a request for the plurality of interaction challenges to the user device.

Upon receipt of the request for the plurality of interaction challenges, the user device requests the user to make a facial expression in response to the mouth open challenge at step 506, to make another facial expression in response to the head yaw left challenge at step 508, and to make yet another facial expression in response to the head pitch up challenge at step 510.

A plurality of images of the user's face corresponding to these facial expressions are respectively captured by the user device at step 512, 514 and 516. The plurality of images of the user's face 518, 520 and 522 are then transmitted from the user device to the face anti-spoofing server.

The face anti-spoofing server then concatenates the plurality of images 518, 520 and 522 into a concatenated image at step 524, uses a CNN classifier to obtain a confidence score for the concatenated image at step 526; and then determines liveness of the user's face based on a comparison of the confidence score and a threshold value at step 528.

At step 530, the face anti-spoofing server can transmit a result of the liveness determination to the user device, which marks an end of the face anti-spoofing process 500.

FIG. 6 shows a flow chart illustrating a method 600 of training a convolutional neural network (CNN) classifier 634 according to an embodiment. The CNN classifier 634 can be configured and trained in the face anti-spoofing server.

In this embodiment, the CNN classifier 634 is trained with a training dataset having a size of N×9×H×W, wherein N is a number of images to be trained in one iteration, H is a height of each of the images, and W is a width of each of the images. In this embodiment, 9 indicates that three images are concatenated in each of the images that are used as input in the training dataset.

As shown in FIG. 6, in the present embodiment, three images 602, 602 and 606 are concatenated into a concatenated image 608. Each of the three images 602, 602 and 606 has a size of 128×128×3, thus the concatenated image 608 has a size of 128×128×9. The concatenated image 608 is provided to the CNN classifier 634 as an input 608.

In this embodiment, the CNN classifier 634 includes a first convolutional layer 610, a first pooling layer 612, a second convolutional layer 614, a second pooling layer 616, a third convolutional layer 618, a third pooling layer 620, a fourth convolutional layer 622, a fourth pooling layer 624, a fully connected layer 626 and an output layer 628.

In this embodiment, the CNN classifier 634 can process the concatenated image 608 through the layers 610 to 628 and obtain a confidence score at the output layer 628 for the concatenated image 608.

The CNN classifier 634 can further include a comparison component 630 to compare confidence score with a threshold value T. For example, if the confidence score is greater than the threshold value T, the face anti-spoofing server can determine that the plurality of images received from the user device are from an attack, not a live person. The concatenated image 608 may be labelled as "attack" and used for future training of the CNN classifier 634. Likewise, if the confidence score is less than or equal to the threshold value T, the face anti-spoofing server can determine that the plurality of images received from the user device are indeed from a live person. The concatenated image 608 may be labelled as "real" and used for future training of the CNN classifier 634.

The CNN classifier 634 can further include a softmax loss layer 632. Confidence scores obtained from the output layer 628 can be passed through the softmax loss layer 632 after the comparison at the comparison component 630. The softmax loss layer then converts the confidence scores into probability values. In this manner, each input in the training data is classified into a corresponding class that has the highest probability value.

Such a CNN classifier 634 in this embodiment is suitable to determine liveness of a user's face based on three images of the user's face corresponding to three facial expressions performed by the user in response to the three randomly selected interaction challenges as described above.

In alternative embodiments, the CNN classifier 634 may be trained by the face anti-spoofing server with a training dataset having a different size. For example, the training dataset can have a size of N×V×H×W, wherein N is a number of images to be trained in one iteration, H is a height of each of the images, W is a width of each of the images, and V indicates that ⅓ V images are concatenated in each of the images that are used as input in the training dataset. In this manner, a CNN classifier 634 trained with a training dataset having a size of N×6×H×W will be suitable to determine liveness of a user's face based on 2 images of the user's face corresponding to 2 facial expressions performed by the user in response to 2 randomly selected interaction challenges. Likewise, a CNN classifier 634 trained with a training dataset having a size of N×12×H×W will be suitable to determine liveness of a user's face based on 4 images of the user's face corresponding to 4 facial expressions performed by the user in response to 4 randomly selected interaction challenges.

Figure 7:
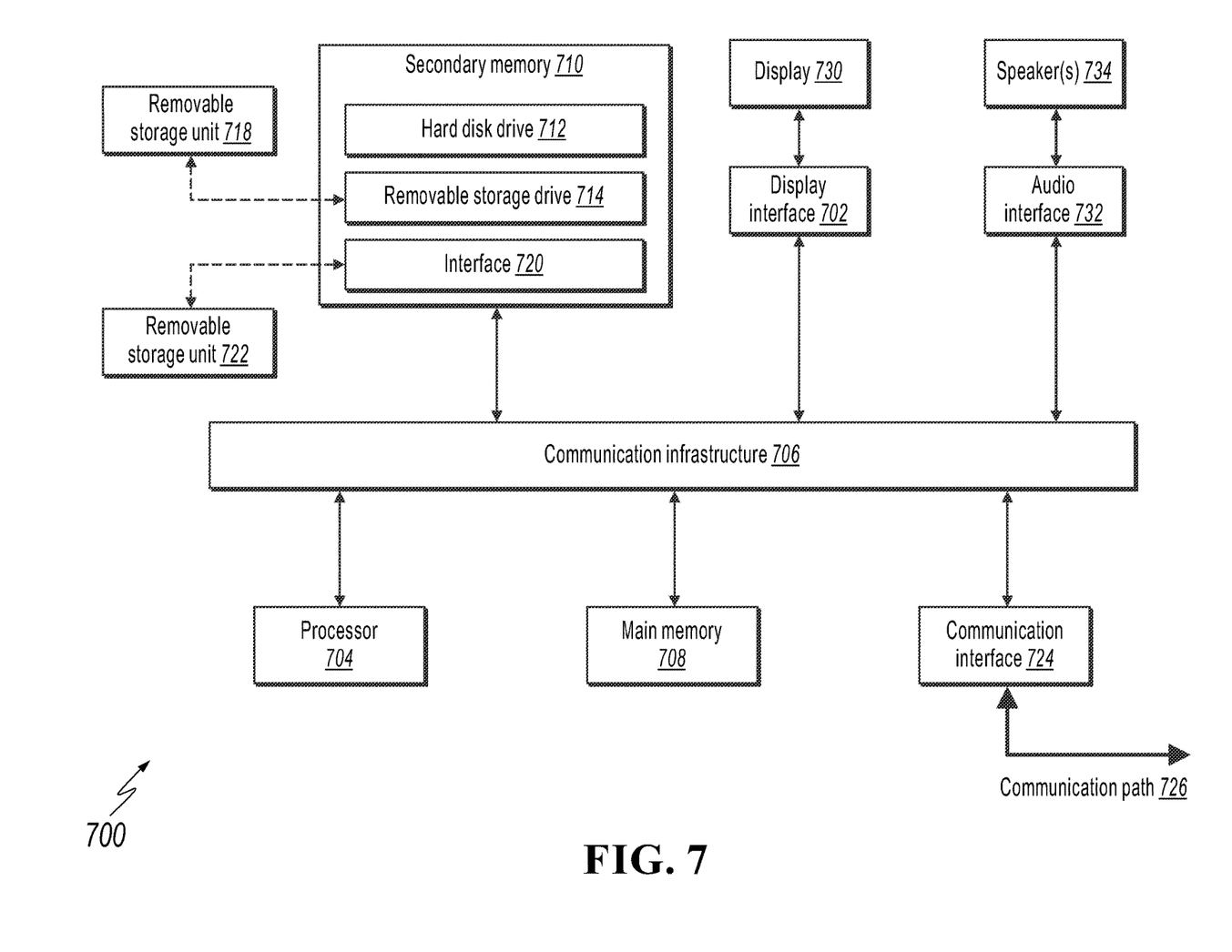
FIG. 7 shows a block diagram of an example of a computer system 700 suitable for use as a face anti-spoofing server 304 or a user device 302 as exemplified in FIGS. 3A and 3B.

FIG. 7 shows a block diagram of a computer system 700 suitable for use as a face anti-spoofing server 304 or a user device 302 as exemplified in FIGS. 3A and 3B.

The following description of the computer system/computing device 700 is provided by way of example only and is not intended to be limiting.

As shown in FIG. 7, the example computing device 700 includes at least one processor 704 for executing software routines. Although a single processor is shown for the sake of clarity, the computing device 700 may also include a multi-processor system. The processor 704 is connected to a communication infrastructure 706 for communication with other components of the computing device 700. The communication infrastructure 706 may include, for example, a communications bus, cross-bar, or network.

The computing device 700 further includes a main memory 708, such as a random access memory (RAM), and a secondary memory 710. The secondary memory 710 may include, for example, a hard disk drive 712 and/or a removable storage drive 714, which may include a magnetic tape drive, an optical disk drive, or the like. The removable storage drive 714 reads from and/or writes to a removable storage unit 718 in a well-known manner. The removable storage unit 718 may include a magnetic tape, optical disk, or the like, which is read by and written to by removable storage drive 714. As will be appreciated by persons skilled in the relevant art(s), the removable storage unit 718 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 720. Examples of a removable storage unit 722 and interface 720 include a removable memory chip (such as an EPROM or PROM) and associated socket, and other removable storage units 722 and interfaces 720 which allow software and data to be transferred from the removable storage unit 722 to the computer system 700.

The computing device 700 also includes at least one communication interface 724. The communication interface 724 allows software and data to be transferred between computing device 700 and external devices via a communication path 726. In various embodiments, the communication interface 724 permits data to be transferred between the computing device 700 and a data communication network, such as a public data or private data communication network. The communication interface 724 may be used to exchange data between different computing devices 700 which such computing devices 700 form part an interconnected computer network. Examples of a communication interface 724 can include a modem, a network interface (such as an Ethernet card), a communication port, an antenna with associated circuitry and the like. The communication interface 724 may be wired or may be wireless. Software and data transferred via the communication interface 724 are in the form of signals which can be electronic, electromagnetic, optical or other signals capable of being received by communication interface 724. These signals are provided to the communication interface via the communication path 726.

Optionally, the computing device 700 further includes a display interface 702 which performs operations for rendering images to an associated display 730 and an audio interface 732 for performing operations for playing audio content via associated speaker(s) 734.

As used herein, the term "computer program product" may refer, in part, to removable storage unit 718, removable storage unit 722, a hard disk installed in hard disk drive 712, or a carrier wave carrying software over communication path 726 (wireless link or cable) to communication interface 724. Computer readable storage media refers to any non-transitory tangible storage medium that provides recorded instructions and/or data to the computing device 700 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer programs (also called computer program code) are stored in main memory 708 and/or secondary memory 710. Computer programs can also be received via the communication interface 724. Such computer programs, when executed, enable the computing device 700 to perform one or more features of embodiments discussed herein. In various embodiments, the computer programs, when executed, enable the processor 704 to perform features of the above-described embodiments. Accordingly, such computer programs represent controllers of the computer system 700.

Software may be stored in a computer program product and loaded into the computing device 700 using the removable storage drive 714, the hard disk drive 712, or the interface 720. Alternatively, the computer program product may be downloaded to the computer system 700 over the communications path 726. The software, when executed by the processor 704, causes the computing device 700 to perform functions of embodiments described herein.

It is to be understood that the embodiment of FIG. 7 is presented merely by way of example. Therefore, in some embodiments one or more features of the computing device 700 may be omitted. Also, in some embodiments, one or more features of the computing device 700 may be combined together. Additionally, in some embodiments, one or more features of the computing device 700 may be split into one or more component parts.

For example, the computing device 700 can be a face anti-spoofing server. The face anti-spoofing server comprises at least one processor and a memory coupled to the at least one processor and storing programming instructions for execution by the at least one processor, the programming instructions instruct the server to: receive a plurality of images of a user's face from a user device, each of the plurality of images corresponding to a facial expression performed by the user in response to each of a plurality of interaction challenges randomly selected from an interaction challenge library; concatenate the plurality of images into a concatenated image; use a convolutional neural network (CNN) classifier to obtain a confidence score for the concatenated image; and determine liveness of the user's face based on a comparison of the confidence score and a threshold value.

In some embodiments, the face anti-spoofing server is further instructed to: build up the interaction challenge library, wherein the interaction challenge library includes interaction challenges of eye blink, mouth open, mouth close, head pitch down, head pitch up, head roll left, head roll right, head yaw left, and/or head yaw right.

In some embodiments, the face anti-spoofing server is further instructed to: randomly select three interaction challenges from the interaction challenge library to form the plurality of interaction challenges.

In some embodiments, the face anti-spoofing server is further instructed to: train the CNN classifier with a training dataset having a size of N×9×H×W, wherein N is a number of images to be trained in one iteration, H is a height of each of the images, and W is a width of each of the images. In these embodiments, 9 indicates that three images are concatenated in each of the images that are used as input in the training dataset.

For example, the computing device 700 can be a device for face anti-spoofing or a user device. The device comprises at least one processor and a memory coupled to the at least one processor and storing programming instructions for execution by the at least one processor, the programming instructions instruct the device to: receive a request for a plurality of interaction challenges from a server, wherein the plurality of interaction challenges are randomly selected from an interaction challenge library; capture a plurality of images of a user's face, each of the plurality of images corresponding to a facial expression performed by the user in response to each of the plurality of interaction challenges; and transmit the captured plurality of images to the server to obtain a confidence score so as to determine liveness of the face based on a comparison of the confidence score and a threshold value.

In some embodiments, the interaction challenge library includes interaction challenges of eye blink, mouth open, mouth close, head pitch down, head pitch up, head roll left, head roll right, head yaw left, and/or head yaw right.

In some embodiments, the plurality of interaction challenges include three interaction challenges randomly selected from the interaction challenge library.

In some embodiments, each of the plurality of interaction challenges requires at least a start expression and an end expression of the face, and wherein the facial expression is the end expression of the face.

The techniques described in this specification produce one or more technical effects. As mentioned above, embodiments of the present specification provide a face anti-spoofing approach that requires fewer interactions from user's side, and in the meanwhile, are able to analyze multiple face images showing multiple views of a face at server's side to determine whether the multiple face images taken for face recognition are from a live person or from an attack. In this manner, the present embodiments of the methods and devices not only improve user experience but also achieve a higher accuracy in face liveness detection.

As described above, by virtue of the random selection of interaction challenges from a broad range of interaction challenges collected in the interaction challenge library, the present specification achieves a reliable face anti-spoofing mechanism without requesting numerous interactions from the user. In this manner, user experience can be improved without sacrificing accuracy of face liveness detection.

In the meanwhile, by virtue of the usage of the plurality of images each corresponding to a facial expression performed by the user in response to each of the plurality of interaction challenges randomly selected from the interaction challenge library, the present specification can achieve a higher accuracy in face liveness detection by concatenating the plurality of images and using a CNN classifier to determine liveness of the concatenated image.

It will be appreciated by a person skilled in the art that numerous variations and/or modifications may be made to the present specification as shown in the specific embodiments without departing from the spirit or scope of the specification as broadly described. The present embodiments are, therefore, to be considered in all respects to be illustrative and not restrictive.

What is claimed is:

1. A computer-implemented method for face anti-spoofing, comprising:
   receiving, by a server and from a user device, a plurality of images of a user face, wherein each of the plurality of images corresponds to an end expression of a facial expression performed by a user in response to each of a plurality of interaction challenges, wherein the facial expression comprises at least a start expression and the corresponding end expression;
   concatenating the plurality of images into a concatenated image;
   processing the concatenated image using a convolutional neural network (CNN) classifier to obtain a confidence score for the concatenated image; and
   determining liveness of the user face based on a comparison of the confidence score and a threshold value.

2. The computer-implemented method of claim 1, wherein each interaction challenge of the plurality of interaction challenges is randomly selected from an interaction challenge library.

3. The computer-implemented method of claim 2, further comprising:
   building up the interaction challenge library.

4. The computer-implemented method of claim 2, wherein the interaction challenge library comprises interaction challenges of at least eye blink, mouth open, mouth close, head pitch down, head pitch up, head roll left, head roll right, head yaw left, and head yaw right.

5. The computer-implemented method of claim 2, further comprising:
   randomly selecting three interaction challenges from the interaction challenge library to form the plurality of interaction challenges.

6. The computer-implemented method of claim 1, further comprising:
   training the CNN classifier with a training dataset having a size of N×V×H×W, wherein N is a number of images to be trained in one iteration, V indicates that ⅓(V) images are concatenated in each of the images that are used as input in the training dataset, H is a height of each of the images, and W is a width of each of the images.

7. A non-transitory computer-readable medium storing one or more instructions executable by a computer system to perform operations for face anti-spoofing, comprising:
   receiving, by a server and from a user device, a plurality of images of a user face, wherein each of the plurality of images corresponds to an end expression of a facial expression performed by a user in response to each of a plurality of interaction challenges, wherein the facial expression comprises at least a start expression and the corresponding end expression;
   concatenating the plurality of images into a concatenated image;
   processing the concatenated image using a convolutional neural network (CNN) classifier to obtain a confidence score for the concatenated image; and
   determining liveness of the user face based on a comparison of the confidence score and a threshold value.

8. The non-transitory computer-readable medium of claim 7, wherein each interaction challenge of the plurality of interaction challenges is randomly selected from an interaction challenge library.

9. The non-transitory computer-readable medium of claim 8, further comprising operations for:
   building up the interaction challenge library.

10. The non-transitory computer-readable medium of claim 8, wherein the interaction challenge library comprises interaction challenges of at least eye blink, mouth open, mouth close, head pitch down, head pitch up, head roll left, head roll right, head yaw left, and head yaw right.

11. The non-transitory computer-readable medium of claim 8, further comprising operations for:
   randomly selecting three interaction challenges from the interaction challenge library to form the plurality of interaction challenges.

12. The non-transitory computer-readable medium of claim 7, further comprising operations for:
   training the CNN classifier with a training dataset having a size of N×V×H×W, wherein N is a number of images to be trained in one iteration, V indicates that ⅓(V) images are concatenated in each of the images that are used as input in the training dataset, H is a height of each of the images, and W is a width of each of the images.

13. A computer-implemented system for face anti-spoofing, comprising:
   one or more computers; and
   one or more computer memory devices interoperably coupled with the one or more computers and having tangible, non-transitory, machine-readable media storing one or more instructions that, when executed by the one or more computers, cause the one or more computers to perform one or more operations comprising:
      receiving, by a server and from a user device, a plurality of images of a user face, wherein each of the plurality of images corresponds to an end expression of a facial expression performed by a user in response to each of a plurality of interaction challenges, wherein the facial expression comprises at least a start expression and the corresponding end expression;
      concatenating the plurality of images into a concatenated image;
      processing the concatenated image using a convolutional neural network (CNN) classifier to obtain a confidence score for the concatenated image; and determining liveness of the user face based on a comparison of the confidence score and a threshold value.

14. The computer-implemented system of claim 13, wherein each interaction challenge of the plurality of interaction challenges is randomly selected from an interaction challenge library.

15. The computer-implemented system of claim 14, further comprising operations for:
building up the interaction challenge library, wherein the interaction challenge library comprises interaction challenges of at least eye blink, mouth open, mouth close, head pitch down, head pitch up, head roll left, head roll right, head yaw left, and head yaw right.

16. The computer-implemented system of claim 14, further comprising operations for:
randomly selecting three interaction challenges from the interaction challenge library to form the plurality of interaction challenges.

17. The computer-implemented system of claim 13, further comprising operations for:
training the CNN classifier with a training dataset having a size of N×V×H×W, wherein N is a number of images to be trained in one iteration, V indicates that $\frac{1}{3}(V)$ images are concatenated in each of the images that are used as input in the training dataset, H is a height of each of the images, and W is a width of each of the images.

* * * * *